United States Patent [19]

Rinaldelli

[11] Patent Number: 4,585,419
[45] Date of Patent: Apr. 29, 1986

[54] DIDACTIC AID FOR THE TEACHING OF ANY NUMBER SYSTEM

[76] Inventor: Maria P. S. Rinaldelli, San Severino Marche (MC), Via, Monte Cucco, 1, Italy

[21] Appl. No.: 673,406

[22] Filed: Nov. 20, 1984

[30] Foreign Application Priority Data

Nov. 25, 1983 [IT] Italy .......................... 19441 B/83[U]

[51] Int. Cl.⁴ .............................................. G09B 19/02
[52] U.S. Cl. ..................................... 434/189; 434/195; 434/207; 434/210
[58] Field of Search ............... 434/210, 195, 189, 205, 434/207, 208, 211, 200, 191, 196, 193, 192

[56] References Cited

U.S. PATENT DOCUMENTS

| | | | |
|---|---|---|---|
| 1,471,437 | 10/1923 | Wood | 434/195 |
| 1,826,034 | 10/1931 | Williamson | 434/210 |
| 2,804,699 | 9/1957 | Robinson | 434/208 |
| 3,280,480 | 10/1966 | Rice | 434/210 X |
| 3,464,123 | 9/1969 | Hurtig | 434/189 |
| 4,176,474 | 12/1979 | O'Sullivan | 434/210 |

*Primary Examiner*—William H. Grieb
*Attorney, Agent, or Firm*—Leonard Bloom

[57] ABSTRACT

The instant invention relates to an aid for the carrying out of a didactic game in order that any (n) based number system may be learned.

It consists of a series of containers decreasing in size, each containing an (n) number of smaller containers which are equal to each other; the smallest container holds an (n) number of pieces each representing a numerical unit. A desk is provided with colored squares or frames arranged in such a way that the last square (frame) on the right is of the same color as the unit of the first order, the penultimate the same color as the unit of the second order and so on.

2 Claims, 5 Drawing Figures

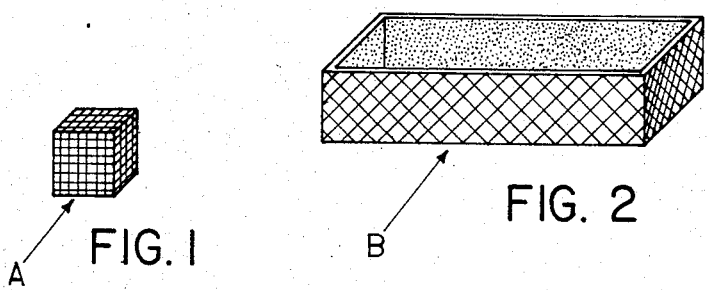
FIG. 1
FIG. 2
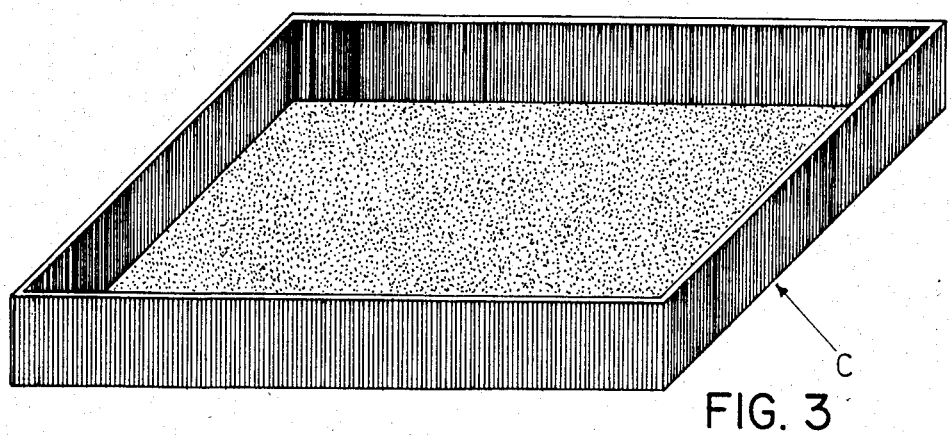
FIG. 3
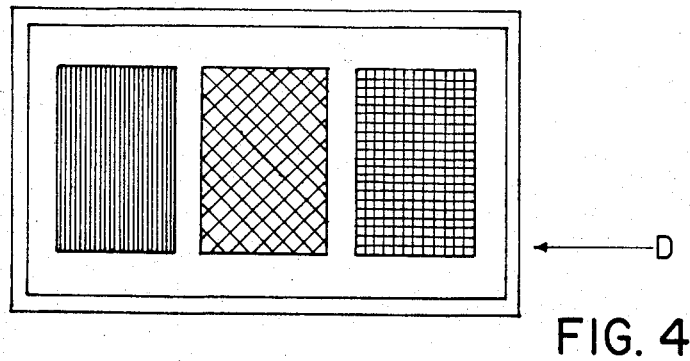
FIG. 4

DIDACTIC AID FOR THE TEACHING OF ANY NUMBER SYSTEM

The instant Application for Industrial Patent has for its object an aid for the carrying out of a didactic game in order that any (n) based number system may be learnt.

For the sake of clarity this specification will refer to the decimal system but there is nothing which prevents the realization of didactic aids suitable for the teaching of any other number systems, as will become apparent further on.

Even though the decimal system has been in use for a long time, suitable aids which make children understand that ten units of a certain order form one unit of a higher unit, are still not available.

With the abacus currently used by children the idea is given of tens and hundreds but not of a "system" of numbers.

As no suitable aids are available, teachers generally use sweets or matches to explain the system based on units of ten; forming groups of ten, rarely groups of a hundred and hardly ever groups of a thousand units.

This method has various drawbacks:

(a) it takes time to form these groups;
(b) whilst the teacher with his/her experience can immediately recognize whether the groups are of ten, a hundred, a thousand, etc., children find it difficult;
(c) for the children the groups look the same whether they are of a hundred, ten or a thousand and therefore they disregard the differences among them.

Another method used is that of making paper squares (representing the units) which are substituted by strips whenever the unit of a higher order is reached.

This method takes time and is rather laborious.

Other teachers use matches with red heads to represent the tens and matches with black heads to represent the units.

This method is suitable for bright children but slower children find it rather mechanical because they cannot understand how a match with a red head can be worth ten matches with black heads. Furthermore, they naturally tend to treat all matches alike, whatever their colour.

The didactic game carried out using the aid in accordance with the herein described invention, is a mathematical one achieved with a series of sets of containers each capable of holding ten smaller containers; containers of the same size having the same colour.

Therefore, there is a series of sets of containers decreasing in size and of differing colours, each container holds a set of ten smaller containers one set being all of the same colour and size, another set of a different colour and size and so on. The smallest container holds ten pieces each representing a numerical unit.

The didactic aid in accordance with the instant invention also includes a desk with coloured squares which are arranged in such a way that the last square on the right is of the same colour as the unit of the first order, the penultimate square of the same colour as the second order and so on.

Finally, this aid also includes all the numerals from zero to nine to be put on to the desk inside the coloured squares, there being the same number of numerals as number of coloured squares on the desk.

These and other objects, features and advantages of the instant invention will become more apparent from the following description when taken in conjunction with the accompanying drawing which are made part of the specification and which are provided for purposes of illustration, to facilitate the understanding of the invention but not of limitation shows the parts of the didactic aid necessary to objectify the units of the first, second and third orders, meaning that numbers up to 999 may be written on the desk. I have employed similar reference characters to designate corresponding parts throughout the description and in said drawings.

FIGS. 1–4 are an axonometrical view illustrating an example of each series of pieces which constitutes the didactic aid in accordance with this invention.

FIG. 1 illustrates a small coloured cube distinguished by the letter (A) which represents a numerical unit; there will be a number of these small cubes (A) equal to the maximum number obtainable with this aid, in this case 999.

FIG. 2 illustrates a small coloured box, of a different colour from the cubes (A) which represents the unit of the second order. This box contains exactly ten small cubes distinguished by the letter (B); there will be a number of these small boxes equal to the maximum number of tens obtainable with this aid, in this case 99.

Figure 5:
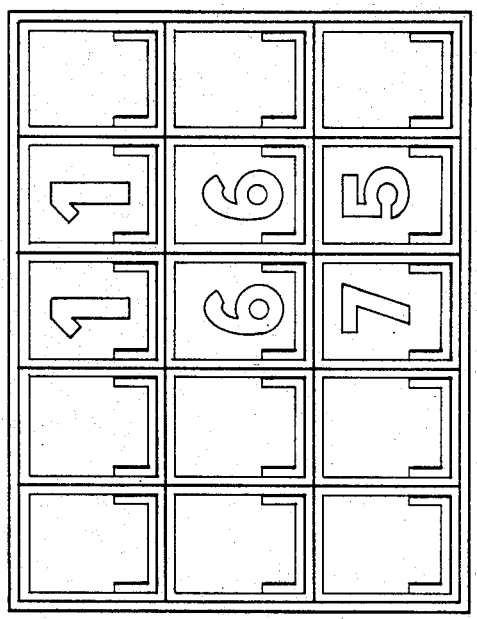

In one preferred arrangement the word "tens" may be written on the outside of the small box (B).

FIG. 3 illustrates a box larger than the previous one and of a different colour, distinguished by the letter (C), provided to contain exactly ten small boxes (B) which represents the unit of the third order; there will be a number of these boxes (C) equal to the maximum number of hundreds obtainable with this aid, in this case 9.

In one preferred arrangement the word "hundreds" may be written on the outside of the box (C).

FIG. 4 illustrates a desk (D) which is provided with three squares, situated side by side and each of a different colour, i.e. the last one on the right is of the same colour as the cubes (A), the penultimate square is of the same colour as the small boxes (B) and the first square on the left the same as the boxes (C).

FIG. 5 illustrates preprinted tags upon which are printed a numeral from zero to (n−1). Said tags may also be blank so that any desired number may be noted upon it.

The aid in accordance with this invention should be used as follows.

The child must first fill the small boxes (B) with the cubes (A), then he must fill the bigger boxes (C) with these boxes (B) until all the cubes are used up.

Then, he will count the boxes of each colour and put down the number, using the figures available on to the corresponding square panel, i.e. on to the square of the same colour.

With this procedure even a child who can only count up to ten will be able to write the number corresponding to various hundreds of units.

For example, with a ten based system if the child fills 3 boxes (C), 2 small boxes (B) and is left with one cube, he will put down the figures 3, 2 and 1 on to the desk, thus writing the number 321. Furthermore, since there is written "hundreds" on all the boxes (C), tens on all the small boxes (B), it will easily be seen that there are three hundreds, two tens and one unit.

In this way the significance of the number is presented "visually" even before it is categorised.

With this method using the aid in accordance with the instant invention, therefore, the child will begin to comprehend the way in which one "numbers", meaning that he sees how the tens, hundreds, thousands etc. are formed.

The colours of the boxes which correspond to the colours of the squares on the desk indicating the units of the same order, makes the child realize immediately that, although the figures are the same they change their significance depending on the square on to which they are put and therefore the importance of the position of the numbers can be clearly seen.

Merely for purposes of illustration we shall now describe the didactic aid when used for the teaching of a number system based on two.

(a) the numerical unit comprises a small coloured cube;
(b) the unit of the second order is a small coloured box provided to contain exactly two cubes;
(c) the unit of the third order is a coloured box, of a different colour from the first, provided to contain exactly two boxes indicated in point (b);
(d) the unit of the fourth order is a coloured box of a different colour from the aforesaid ones provided to contain exactly two boxes mentioned in point (c); and so on.

The desk is provided with numerous coloured squares each being of the same colour as one of the aforesaid units.

It is understood, therefore, that the aid in accordance with the instant invention may be varied so that any number system may be learnt without departure from the nature and principle thereof as defined by the following claims.

I claim:

1. In a didactic aid for the teaching of any (N) based number system of the type having a series of sets of container means, each such set of container means being associated with a respective numerical order and each being provided to hold a number (N) of other sets of container means associated with lesser numerical orders, wherein the improvement comprises means including a series of frames, each respective frame being color coded to a particular set of container means and each of said color coded frames being arranged side by side, whereby the last frame on the right is of the same color as container means representing the unit of the first order, the penultimate frame is of the same color as the container means representing the unit of the second order and so on, the last frame on the left being of the same color as the container means representing the unit of the highest order, and further including selected numerical figures adapted to be substantially fitted within a respective frame, whereby the numerical figure corresponding to the number of color coded container means counted of a particular numerical order may be selected and placed within the frame whose color corresponds to the color of the particular series of container means being counted.

2. The improvement of claim 1, wherein each of said frames comprises a square.

* * * * *